United States Patent
Naresh et al.

(10) Patent No.: US 10,331,447 B2
(45) Date of Patent: Jun. 25, 2019

(54) PROVIDING EFFICIENT RECURSION HANDLING USING COMPRESSED RETURN ADDRESS STACKS (CRASS) IN PROCESSOR-BASED SYSTEMS

(71) Applicant: QUALCOMM Incorporated, San Diego, CA (US)

(72) Inventors: Vignyan Reddy Kothinti Naresh, Morrisville, NC (US); Anil Krishna, Lakeway, TX (US)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 15/690,812

(22) Filed: Aug. 30, 2017

(65) Prior Publication Data
US 2019/0065197 A1    Feb. 28, 2019

(51) Int. Cl.
*G06F 9/38*    (2018.01)
*G06F 12/02*    (2006.01)
(Continued)

(52) U.S. Cl.
CPC ...... *G06F 9/30058* (2013.01); *G06F 9/30145* (2013.01); *G06F 9/3806* (2013.01);
(Continued)

(58) Field of Classification Search
CPC .... G06F 9/134; G06F 9/30163; G06F 9/3804; G06F 9/3806; G06F 9/3844;
(Continued)

(56) References Cited

U.S. PATENT DOCUMENTS 5,903,230 A    5/1999 Masenas
6,560,696 B1 *    5/2003 Hummel ............. G06F 9/30134
711/109

(Continued)

FOREIGN PATENT DOCUMENTS

JP    H0876998 A    3/1996

OTHER PUBLICATIONS

International Search Report and Written Opinion for PCT/US2018/046485, dated Nov. 9, 2018, 16 pages.

*Primary Examiner* — Daniel H Pan
(74) *Attorney, Agent, or Firm* — Withrow & Terranova, PLLC

(57) ABSTRACT

Providing efficient recursion handling using compressed return address stacks (CRASs) in processor-based systems is disclosed. In one aspect, a processor-based system provides a branch prediction circuit including a CRAS. Each CRAS entry within the CRAS includes an address field and a counter field. When a call instruction is encountered, a return address of the call instruction is compared to the address field of a top CRAS entry indicated by a CRAS top-of-stack (TOS) index. If the return address matches the top CRAS entry, the counter field of the top CRAS entry is incremented instead of adding a new CRAS entry for the return address. When a return instruction is subsequently encountered in the instruction stream, the counter field of the top CRAS entry is decremented if its value is greater than zero (0), or, if not, the top CRAS entry is removed from the CRAS.

24 Claims, 13 Drawing Sheets

(51) Int. Cl.
*G06F 9/42* (2006.01)
*G06F 9/30* (2018.01)
*G06F 12/0875* (2016.01)

(52) U.S. Cl.
CPC ...... *G06F 9/30134* (2013.01); *G06F 9/30163* (2013.01); *G06F 9/3804* (2013.01); *G06F 9/3844* (2013.01); *G06F 12/0875* (2013.01); *G06F 2212/451* (2013.01)

(58) Field of Classification Search
CPC .. G06F 9/3846; G06F 9/3848; G06F 9/30058; G06F 9/30145; G06F 2212/451; G06F 12/0875; G06F 9/30134
USPC .......................... 712/202, 234–240; 711/132
See application file for complete search history.

(56) References Cited

U.S. PATENT DOCUMENTS

| | | | |
|---|---|---|---|
| 6,973,563 B1 * | 12/2005 | Sander | G06F 9/30054 712/239 |
| 7,752,425 B2 | 7/2010 | Williams et al. | |
| 9,256,515 B2 | 2/2016 | Madampath | |
| 9,384,260 B1 | 7/2016 | Gupta et al. | |
| 9,442,725 B2 | 9/2016 | Madampath et al. | |
| 2010/0161951 A1 * | 6/2010 | Chiou | G06F 9/3806 712/240 |
| 2015/0227373 A1 | 8/2015 | Mudawar | |

* cited by examiner

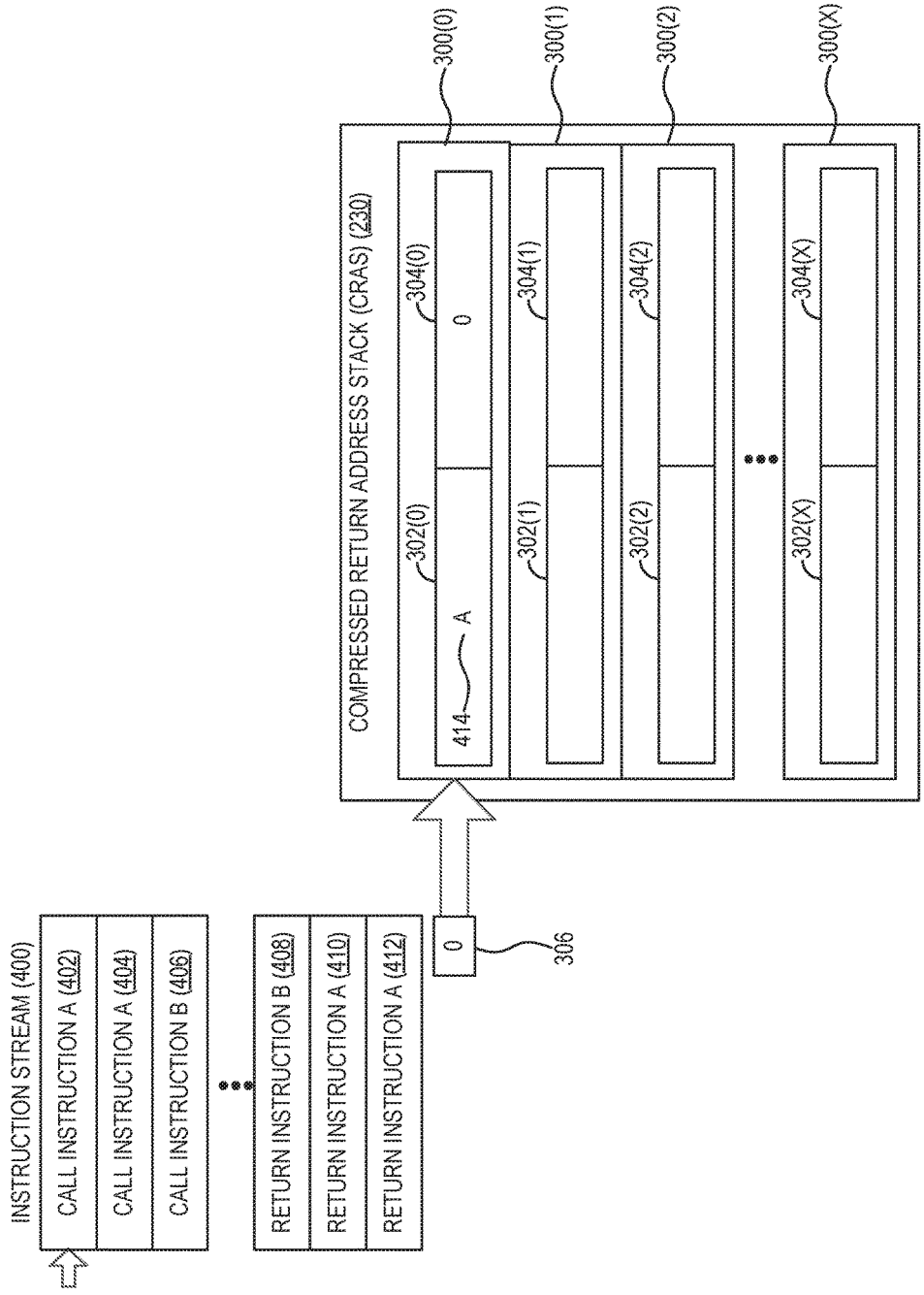

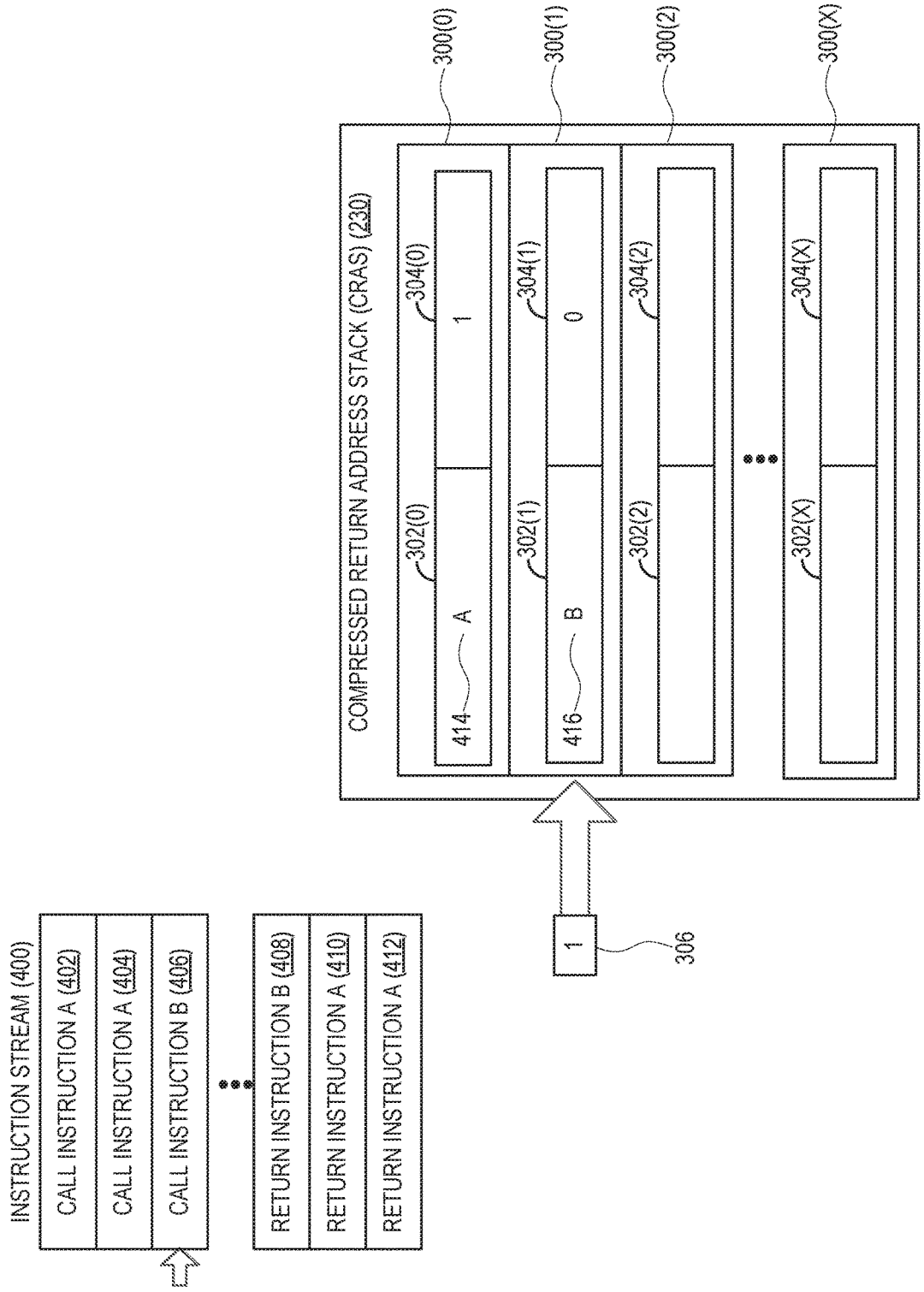

PROVIDING EFFICIENT RECURSION HANDLING USING COMPRESSED RETURN ADDRESS STACKS (CRASS) IN PROCESSOR-BASED SYSTEMS

BACKGROUND

I. Field of the Disclosure

The technology of the disclosure relates generally to return address stacks in processor-based systems, and, in particular, to managing return addresses for recursive call instructions.

II. Background

Conventional processor-based systems frequently make use of branch predictors to maximize processor performance, especially when carrying out concurrent execution of multiple instructions within an execution pipeline. Branch predictors enable a processor to predict whether a conditional call instruction will be taken, and thus may allow the processor to avoid stalling the fetching of additional instructions while waiting for the conditional call instruction to execute. Branch predictors often employ a data structure known as a return address stack (RAS) to store a call instruction's return address (i.e., the address of an instruction that immediately follows the call instruction, and to which program flow should return once the instructions to which program flow has been redirected have executed). The use of an RAS allows the target address of a return instruction to be predicted with a high degree of accuracy by the call predictor.

FIG. 1 illustrates an exemplary implementation of a conventional RAS 100 as a stack that follows a last-in, first-out (LIFO) policy, and that provides a plurality of RAS entries 102(0)-102(R). As call instructions are encountered in an instruction stream of an execution pipeline, a top-of-stack (TOS) index 104 is incremented, and the return addresses corresponding to the call instructions are written into the RAS entries 102(0)-102(R) indicated by the TOS index 104. When a return instruction is encountered, the address at the RAS entry 102(0)-102(R) indicated by the TOS index 104 is read out, and the TOS index 104 is decremented.

Software executed by the processor-based system often employs recursive functions, which are functions that call themselves. Each time a recursive function calls itself, another RAS entry 102(0)-102(R) in the RAS 100 is allocated to store a return address. However, because the size of the RAS 100 is limited, recursive function calls may consume all available space within the RAS 100, and may cause the oldest RAS entries 102(0)-102(R) in the RAS 100 to be overwritten. As a result, the rate of misprediction of the target address for the return instruction of each recursive call may increase, thus negatively impacting system performance.

SUMMARY OF THE DISCLOSURE

Aspects according to the disclosure include providing efficient recursion handling using compressed return address stacks (CRASs) in processor-based systems. In this regard, in one aspect, a processor-based system provides a branch prediction circuit including a CRAS. Each of a plurality of CRAS entries within the CRAS includes an address field and a counter field. When a call instruction is encountered in an instruction stream of an execution pipeline of the processor-based system, a return address of the call instruction is compared to the address field of a top CRAS entry indicated by a CRAS top-of-stack (TOS) index. If the return address matches the top CRAS entry, the counter field of the top CRAS entry is incremented instead of adding a new CRAS entry for the return address. If the return address does not match the top CRAS entry, a new CRAS entry is added to the CRAS as with a conventional RAS. When a return instruction is subsequently encountered in the instruction stream, the counter field of the top CRAS entry is decremented if its value is greater than zero (0). If the value of the counter field of the top CRAS entry already has a value of zero (0), the top CRAS entry is removed from the CRAS per conventional RAS functionality.

Some aspects further provide a call pattern table (CPT) configured to capture sequences of return addresses. In such aspects, each CPT entry within the CPT stores indices of CRAS entries as an address index stack, and also provides a counter field to track a count for each sequence. As CRAS entries are added to the CRAS, the top CPT entry of the CPT is updated to store an ongoing sequence of CRAS entries. If the address index stack of the top CPT entry of the CPT matches the address index stack of a previous CPT entry, the counter field for the previous CPT entry is incremented, and the top CPT entry is cleared to track the next sequence of CRAS entries.

In another aspect, a processor-based system for efficiently handling recursion is provided. The processor-based system includes a branch prediction circuit that provides a CRAS. The CRAS includes a plurality of CRAS entries, each of which provides an address field and a counter field. The branch prediction circuit further includes a CRAS TOS index to indicate a top CRAS entry of the plurality of CRAS entries of the CRAS. The branch prediction circuit is configured to, upon execution of a call instruction by an execution pipeline of the processor-based system, determine a return address corresponding to the call instruction. The branch prediction circuit is further configured to determine whether the return address matches the address field of the top CRAS entry indicated by the CRAS TOS index. The branch prediction circuit is also configured to, responsive to determining that the return address matches the address field of the top CRAS entry, increment the counter field of the top CRAS entry.

In another aspect, a method for efficiently handling recursion is provided. The method includes determining, by a branch prediction circuit of a processor-based system, a return address corresponding to a call instruction executed by an execution pipeline of the processor-based system. The method further includes determining whether the return address matches an address field of a top CRAS entry of a plurality of CRAS entries of a CRAS indicated by a CRAS TOS index, wherein each CRAS entry of the plurality of CRAS entries comprises an address field and a counter field. The method also includes, responsive to determining that the return address matches the address field of the top CRAS entry, incrementing the counter field of the top CRAS entry.

In another aspect, a processor-based system for efficiently handling recursion is provided. The processor-based system includes a means for determining a return address corresponding to a call instruction executed by an execution pipeline of the processor-based system. The processor-based system further includes a means for determining whether the return address matches an address field of a top CRAS entry of a plurality of CRAS entries of a CRAS indicated by a CRAS TOS index, wherein each CRAS entry of the plurality of CRAS entries comprises an address field and a counter field. The processor-based system also includes a means for incrementing the counter field of the top CRAS entry, responsive to determining that the return address matches the address field of the top CRAS entry.

In another aspect, a non-transitory computer-readable medium is provided. The non-transitory computer-readable medium stores computer-executable instructions which, when executed by a processor, cause the processor to determine a return address corresponding to a call instruction executed by an execution pipeline of a processor-based system. The computer-executable instructions further cause the processor to determine whether the return address matches an address field of a top CRAS entry of a plurality of CRAS entries of a CRAS indicated by a CRAS TOS index, wherein each CRAS entry of the plurality of CRAS entries comprises an address field and a counter field. The computer-executable instructions also cause the processor to, responsive to determining that the return address matches the address field of the top CRAS entry, increment the counter field of the top CRAS entry.

BRIEF DESCRIPTION OF THE FIGURES

FIGS. 4A-4C are block diagrams illustrating exemplary operations of the CRAS of FIGS. 2 and 3 for tracking return addresses of recursive calls;

DETAILED DESCRIPTION

Figure 1:
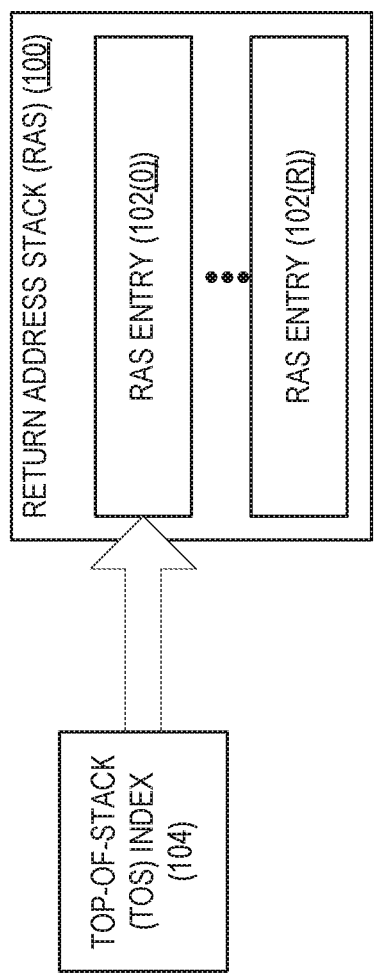
FIG. 1 is a block diagram of a conventional return address stack (RAS) implemented as a stack following a last-in, first-out (LIFO) policy.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include providing efficient recursion handling using compressed return address stacks (CRASs) in processor-based systems.

Figure 2:
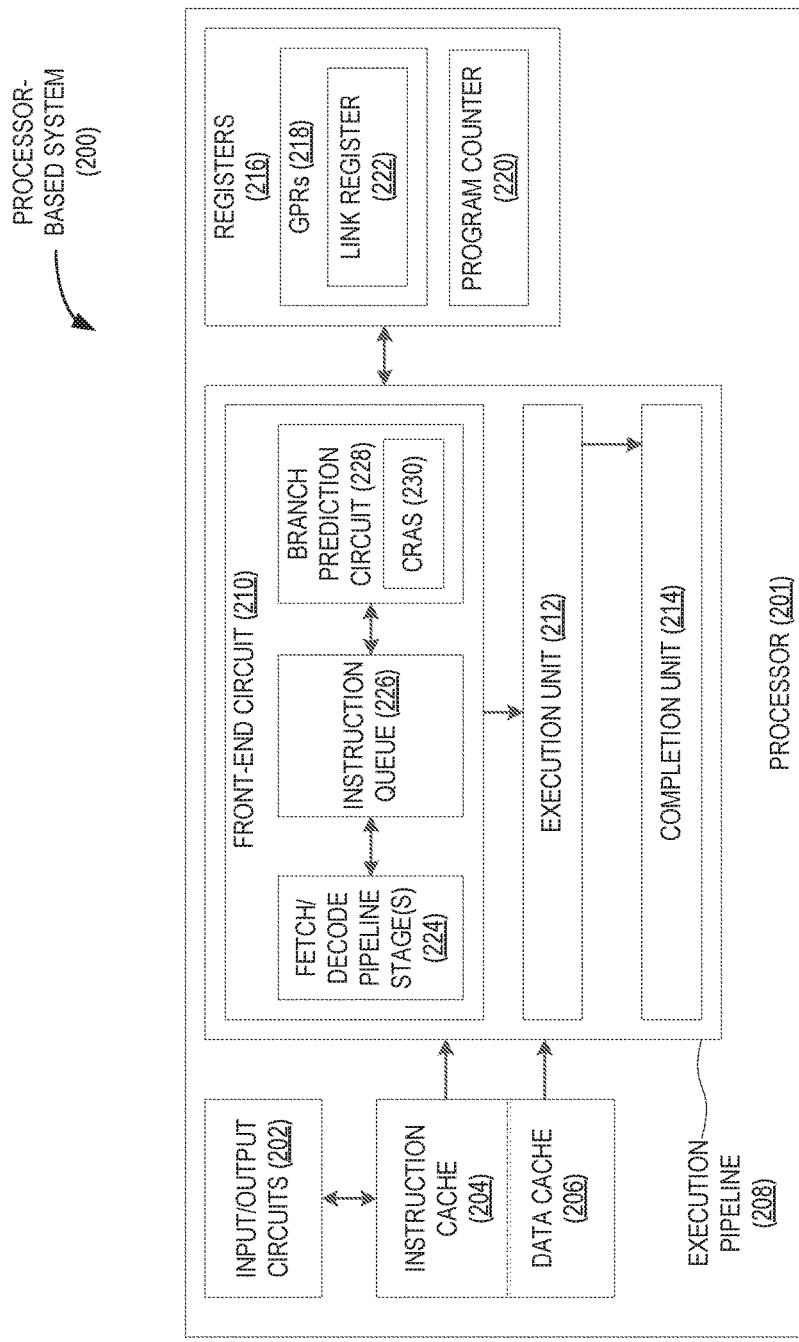
FIG. 2 is a block diagram of an exemplary processor-based system including a branch prediction circuit providing a compressed RAS (CRAS)

Before describing the features provided by the CRAS, an exemplary processor-based system providing a branch prediction circuit including a CRAS is first described. In this regard, FIG. 2 illustrates an exemplary processor-based system 200. The processor-based system 200 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor dies or packages.

The processor-based system 200 includes a processor 201 that provides input/output circuits 202, an instruction cache 204, and a data cache 206. The processor-based system 200 further comprises an execution pipeline 208, which includes a front-end circuit 210, an execution unit 212, and a completion unit 214. The processor-based system 200 additionally includes registers 216, which comprise one or more general purpose registers (GPR) 218, a program counter 220, and a link register 222. In some aspects, such as those employing the ARM® ARM7™ architecture, the link register 222 is one of the GPRs 218, as shown in FIG. 1. Alternately, some aspects, such as those utilizing the IBM® PowerPC® architecture, may provide that the link register 222 is separate from the GPRs 218 (not shown).

In an exemplary operation, the front-end circuit 210 of the execution pipeline 208 fetches instructions (not shown) from the instruction cache 204, which in some aspects may be an on-chip Level 1 (L1) cache, as a non-limiting example. The fetched instructions are decoded by the front-end circuit 210 and issued to the execution unit 212. The execution unit 212 executes the issued instructions, and the completion unit 214 retires the executed instructions. In some aspects, the completion unit 214 may comprise a write-back mechanism that stores the execution results in one or more of the registers 216. It is to be understood that the execution unit 212 and/or the completion unit 214 may each comprise one or more sequential pipeline stages. It is to be further understood that instructions may be fetched and/or decoded in groups of more than one.

To improve performance, the processor-based system 200 may employ branch prediction, the exemplary operation of which is now described. The front-end circuit 210 comprises one or more fetch/decode pipeline stages 224, which enable multiple instructions to be fetched and decoded concurrently. An instruction queue 226 for holding fetched instructions pending dispatch to the execution unit 212 is communicatively coupled to one or more of the fetch/decode pipeline stages 224. The instruction queue 226 is also communicatively coupled to a branch prediction circuit 228, which is configured to generate branch predictions (not shown) for conditional call instructions that are encountered in the instruction queue 226.

A conventional branch prediction circuit (not shown) may employ the return address stack (RAS) 100 of FIG. 1 to track return addresses for call instructions that are predicted to be taken. The conventional branch prediction circuit may record a sequential address as a call return address when a predicted-taken call instruction corresponding to a subroutine call is observed (e.g., by using a PUSH operation to place the sequential address onto the RAS 100). As used herein, the "sequential address" refers to an address of a next instruction following the predicted-taken call instruction in program order. The conventional branch prediction circuit may later restore a recorded sequential address as a target address prediction when a predicted-taken call instruction corresponding to a subroutine return is observed (e.g., by using a POP operation to remove the sequential address from the stack).

However, as noted above, the RAS 100 of the conventional branch prediction circuit may not be able to efficiently handle recursive function calls within an instruction stream. Each recursive function call consumes another RAS entry 102(0)-102(R) within the RAS 100 to store the corresponding return address. However, because the size of the RAS 100 is limited, recursive function calls may consume all available space within the RAS 100, and may cause the oldest RAS entries 102(0)-102(R) in the RAS to be overwritten. As a result, the conventional branch prediction circuit may suffer from an increased rate of misprediction of the target address for the return instruction of each recursive call, thus negatively impacting system performance.

In this regard, the branch prediction circuit 228 of FIG. 2 provides a CRAS 230 to more efficiently handle return addresses for recursive function calls. Each entry (not shown) within the CRAS 230 is associated with a counter field that is incremented if the return address being pushed onto the CRAS 230 matches the most recently added CRAS entry. The counter field is subsequently decremented upon encountering a return instruction, and the CRAS entry is deallocated when the value of the counter field reaches zero (0). In this manner, multiple instances of the same return address for a series of recursive calls may be collapsed into a single CRAS entry.

Figure 3:
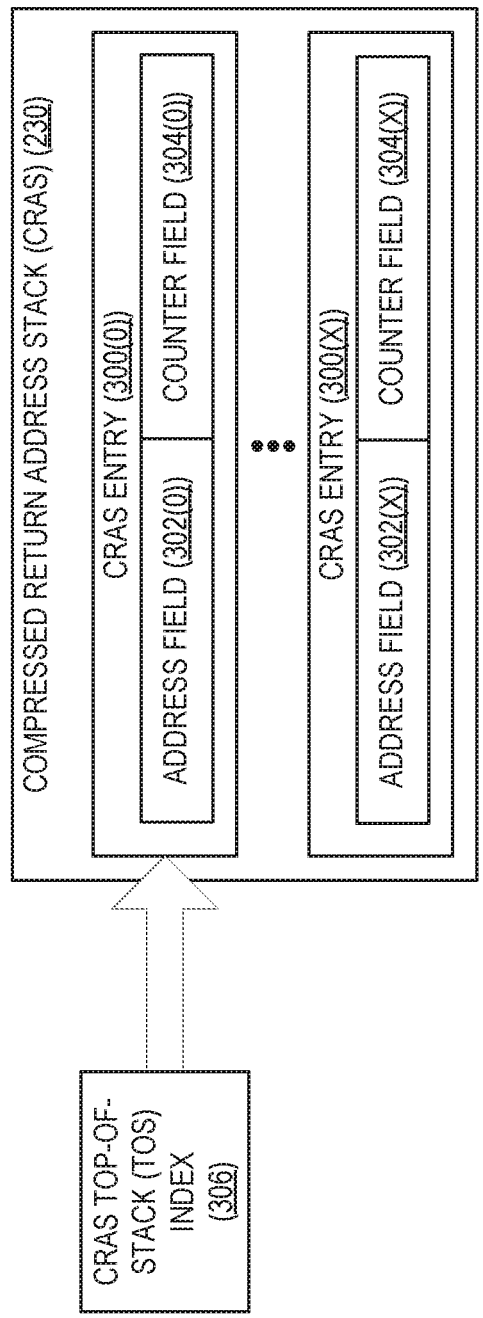
FIG. 3 is a block diagram illustrating exemplary elements of the CRAS of FIG. 2 for providing efficient recursion handling.

FIG. 3 shows a more detailed view of the elements of the CRAS 230 of FIG. 2. As seen in FIG. 3, the CRAS 230 provides a plurality of CRAS entries 300(0)-300(X), with the number X of the CRAS entries 300(0)-300(X) varying in different aspects according to the specific implementation of the CRAS 230. Each of the CRAS entries 300(0)-300(X) includes an address field 302(0)-302(X) in which a return address of a call instruction may be stored. The CRAS entries 300(0)-300(X) also include counter fields 304(0)-304(X) for tracking a count of occurrences of the return address stored in the corresponding address fields 302(0)-302(X). To indicate the "top" of the CRAS 230, a CRAS top-of-stack (TOS) index 306 is provided. The CRAS TOS index 306 stores a value of the index of the current top CRAS entry 300(0)-300(X) of the CRAS 230.

Figure 4B:
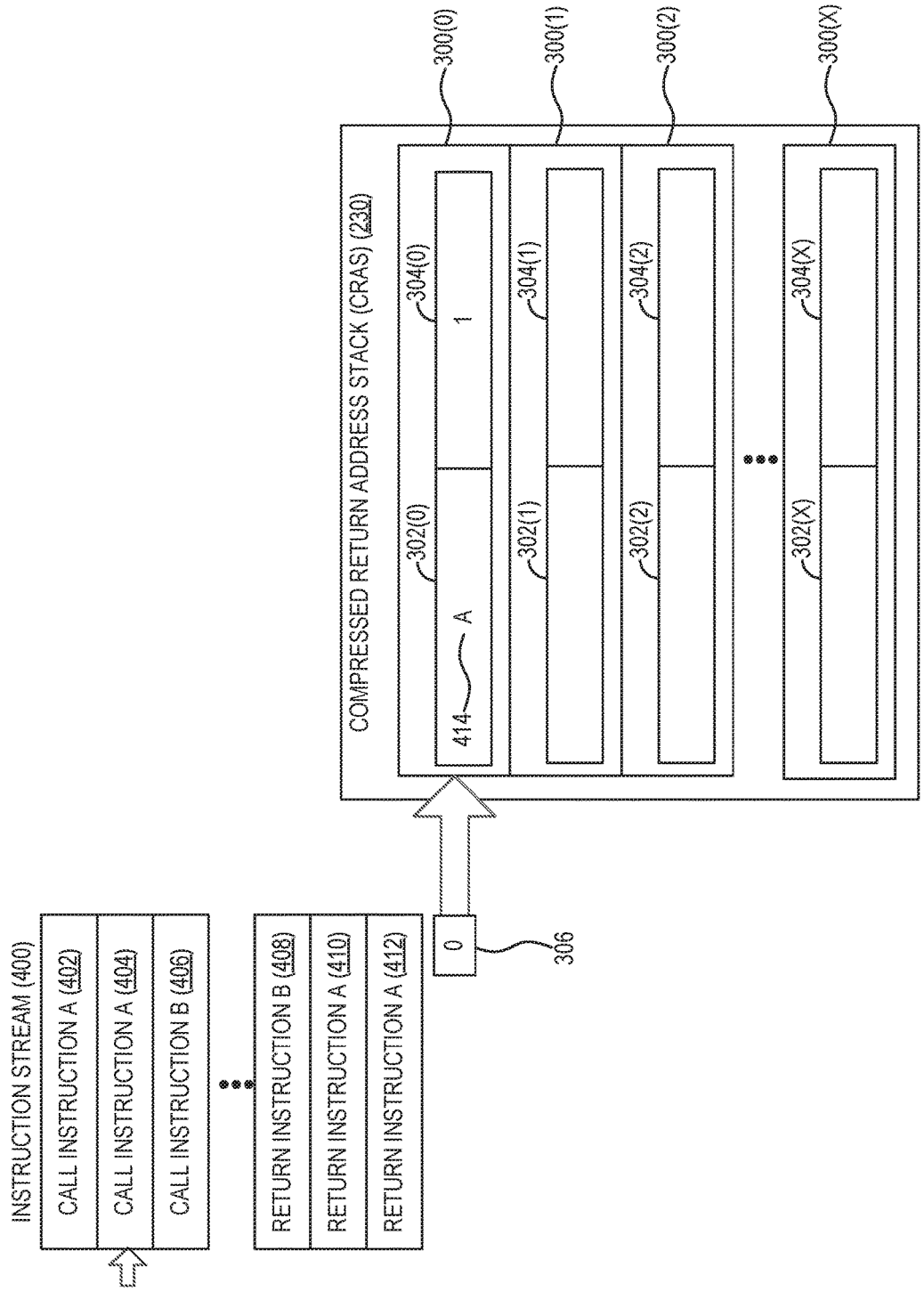

To illustrate exemplary operations of the branch prediction circuit 228 of FIG. 2 and the CRAS 230 of FIGS. 2 and 3 for tracking return addresses of recursive calls, FIGS. 4A-4C are provided. In FIGS. 4A-4C, the CRAS entries 300(0)-300(X) of the CRAS 230 are illustrated, with the CRAS TOS index 306 having a value of zero (0) to indicate that CRAS entry 300(0) is the top CRAS entry 300(0) (i.e., the current "top" of the stack). An instruction stream 400 represents the program order of a series of call instructions 402, 404, 406 and return instructions 408, 410, 412 to be executed by the execution pipeline 208 of the processor-based system 200 of FIG. 2.

As seen in FIG. 4A, the call instruction 402 ("CALL INSTRUCTION A") is encountered in the instruction stream 400. As a result, a return address "A" 414 of the call instruction 402 is stored in address field 302(0) of the top CRAS entry 300(0) indicated by the CRAS TOS index 306. Because this is the first encounter with the call instruction 402, counter field 304(0) of the top CRAS entry 300(0) is initialized with a value of zero (0).

In FIG. 4B, the call instruction 404, which is the second instance of "CALL INSTRUCTION A" and the first recursive call, is encountered. At this point, the return address "A" 414 of the call instruction 404 is compared with the address field 302(0) of the CRAS entry 300(0) indicated by the CRAS TOS index 306. Because the return address "A" 414 of the call instruction 404 matches the address field 302(0) of the CRAS entry 300(0), the counter field 304(0) of the CRAS entry 300(0) is incremented to a value of one (1), rather than allocating a new CRAS entry 300(0)-300(X) to store the return address "A" 414 of the call instruction 404.

Referring now to FIG. 4C, a subsequent call instruction 406 ("CALL INSTRUCTION B") is encountered in the instruction stream 400. As before, a return address "B" 416 of the call instruction 406 is compared with the address field 302(0) of the CRAS entry 300(0). However, in this case, the return address "B" 416 does not match the address field 302(0) of the CRAS entry 300(0). Consequently, the CRAS TOS index 306 is incremented to a value of one (1) to indicate that CRAS entry 300(1) is now the top CRAS entry 300(1) of the CRAS 230. The return address "B" 416 is stored in the address field 302(1) of the CRAS entry 300(1), and the counter field 304(1) of the CRAS entry 300(1) is initialized to a value of zero (0).

When a return instruction, such as the return instructions 408, 410, 412 of the instruction stream 400, is encountered, the CRAS 230 is updated in reverse fashion. First, the return address 414, 416 of the top CRAS entry 300(0)-300(X) indicated by the CRAS TOS index 306 is provided to the execution pipeline 208 of the processor-based system 200 as a return address. If the value of the counter field 304(0)-304(X) of the top CRAS entry 300(0)-300(X) indicated by the CRAS TOS index 306 equals zero (0), the CRAS TOS index 306 is decremented to indicate that the previous CRAS entry 300(0)-300(X) is now the top CRAS entry 300(0)-300(X). For example, when the return instruction 408 ("RETURN INSTRUCTION B") is encountered, the return address "B" 416 is provided to the execution pipeline 208. Because the counter field 304(1) has a value of zero (0), the CRAS TOS index 306 is decremented to a value of zero (0) to indicate that the CRAS entry 300(0) is now the top CRAS entry 300(0). However, if the value of the counter field 304(0)-304(X) of the top CRAS entry 300(0)-300(X) indicated by the CRAS TOS index 306 is greater than zero, the counter field 304(0)-304(X) is decremented, and the CRAS TOS index 306 is not updated.

Figure 5:
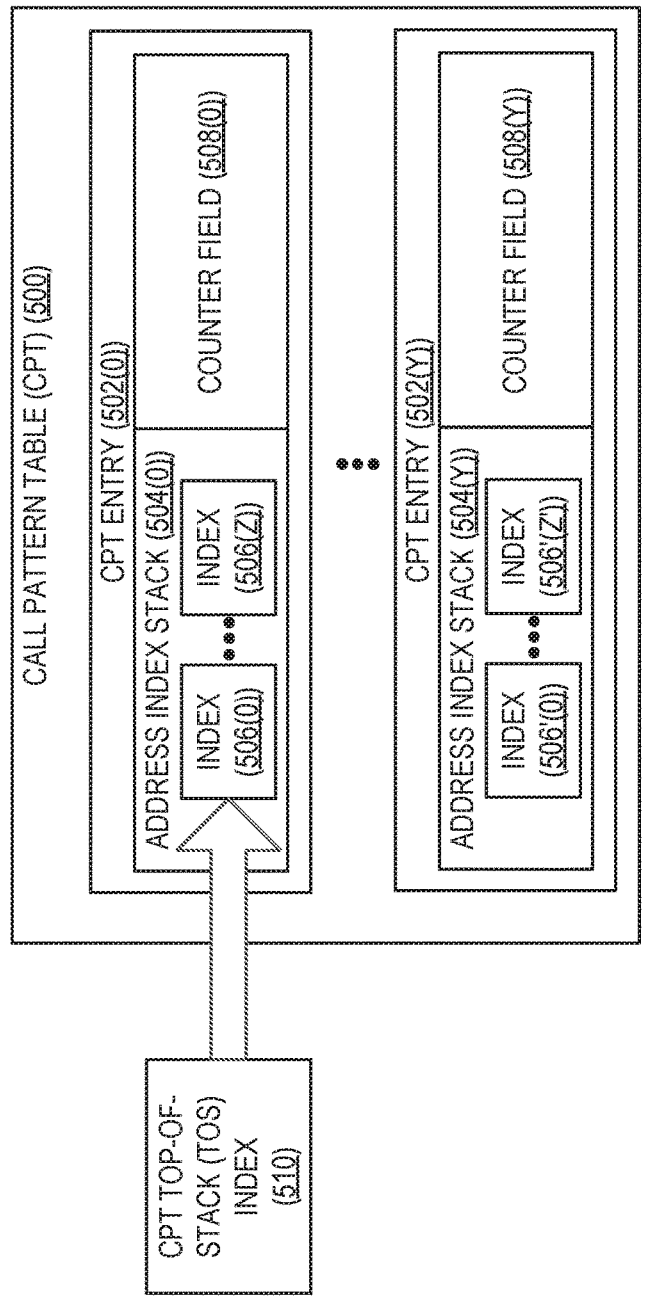
FIG. 5 is a block diagram illustrating exemplary elements of a call pattern table (CPT) that may be used in conjunction with the CRAS of FIGS. 2 and 3 for tracking multi-level recursive calls.

The CRAS 230 illustrated in FIGS. 2 and 3 provides efficient handling of single-level recursion (i.e., instances in which a single recursive function calls itself), but may still be overwhelmed by multi-level recursion (i.e., instances in which a first recursive function calls a second, which calls a third, which calls the first, and so on in like fashion). In this regard, the branch prediction circuit 228 of FIG. 2 may further provide a call pattern table (CPT) to track and count sequences of indices of the CRAS entries 300(0)-300(X) of the CRAS 230. FIG. 5 shows exemplary elements of a CPT 500 providing a plurality of CPT entries 502(0)-502(Y). The CPT entries 502(0)-502(Y) include respective address index stacks 504(0)-504(Y), which store indices 506(0)-506(Z), 506'(0)-506'(Z') of the CRAS entries 300(0)-300(X) of the CRAS 230 of FIGS. 2 and 3. In this manner, the address index stacks 504(0)-504(Y) may be used to track recurring sequences of return addresses stored in the CRAS 230. The CPT entries 502(0)-502(Y) also provide counter fields 508(0)-508(Y) for tracking a number of consecutive occurrences of the recurring sequences of return addresses. A CPT TOS index 510 is used to indicate not only a top CPT entry 502(0)-502(Y) within the CPT 500, but also the current index 506(0)-506(Z) of the top CPT entry 502(0)-502(Y) of the CPT 500. Exemplary operations for using the CPT 500 to manage multi-level recursion according to some aspects are discussed in greater detail with respect to FIGS. 8A-8B and 9.

Figure 6:
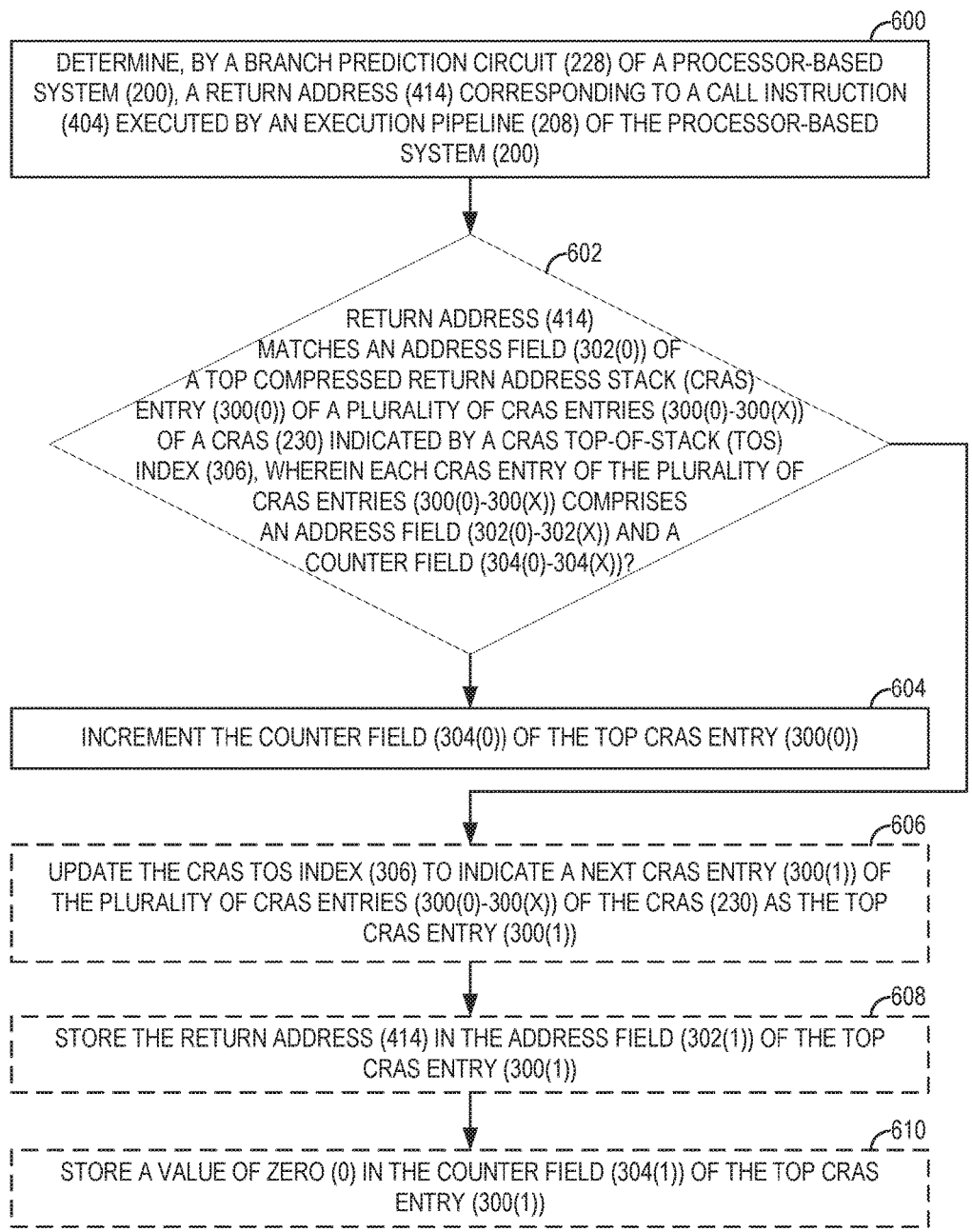
FIG. 6 is a flowchart illustrating exemplary operations for providing efficient recursion handling by the branch prediction circuit of FIG. 2 using the CRAS of FIGS. 2 and 3.

FIG. 6 is a flowchart illustrating exemplary operations for providing efficient recursion handling by the branch prediction circuit 228 of FIG. 2 using the CRAS 230 of FIGS. 2 and 3. For the sake of clarity, elements of FIGS. 2, 3, and 4A-4C are referenced in describing FIG. 6. Operations in FIG. 6 begin with the branch prediction circuit 228 of the processor-based system 200 determining a return address 414 corresponding to a call instruction 402 executed by an execution pipeline 208 of the processor-based system 200 (block 600). In this regard, the branch prediction circuit 228 may be referred to herein as "a means for determining a return address corresponding to a call instruction executed by an execution pipeline of the processor-based system." The branch prediction circuit 228 next determines whether the return address 414 matches an address field 302(0) of a top CRAS entry 300(0) of the plurality of CRAS entries 300(0)-300(X) of the CRAS 230 indicated by the CRAS TOS index 306, wherein each CRAS entry of the plurality of CRAS entries 300(0)-300(X) comprises an address field 302(0)-302(X) and a counter field 304(0)-304(X) (block 602). Accordingly, the branch prediction circuit 228 may be referred to herein as "a means for determining whether the return address matches an address field of a top compressed return address stack (CRAS) entry of a plurality of CRAS entries of a CRAS indicated by a CRAS top-of-stack (TOS) index, wherein each CRAS entry of the plurality of CRAS entries comprises an address field and a counter field."

If the branch prediction circuit 228 determines at decision block 602 that the return address 414 matches the address field 302(0) of the top CRAS entry 300(0), the branch prediction circuit increments the counter field 304(0) of the top CRAS entry 300(0) (block 604). The branch prediction circuit thus may be referred to herein as "a means for incrementing the counter field of the top CRAS entry, responsive to determining that the return address matches the address field of the top CRAS entry." However, if the return address 414 does not match the address field 302(0) of the top CRAS entry 300(0), the branch prediction circuit 228 in some aspects updates the CRAS TOS index 306 to indicate a next CRAS entry 300(1) of the plurality of CRAS entries 300(0)-300(X) of the CRAS 230 as the top CRAS entry 300(1) (block 606). The branch prediction circuit 228 next stores the return address 414 in the address field 302(1) of the top CRAS entry 300(1) (block 608). The branch prediction circuit 228 then stores a value of zero (0) in the counter field 304(1) of the top CRAS entry 300(1) (block 610).

Figure 7:
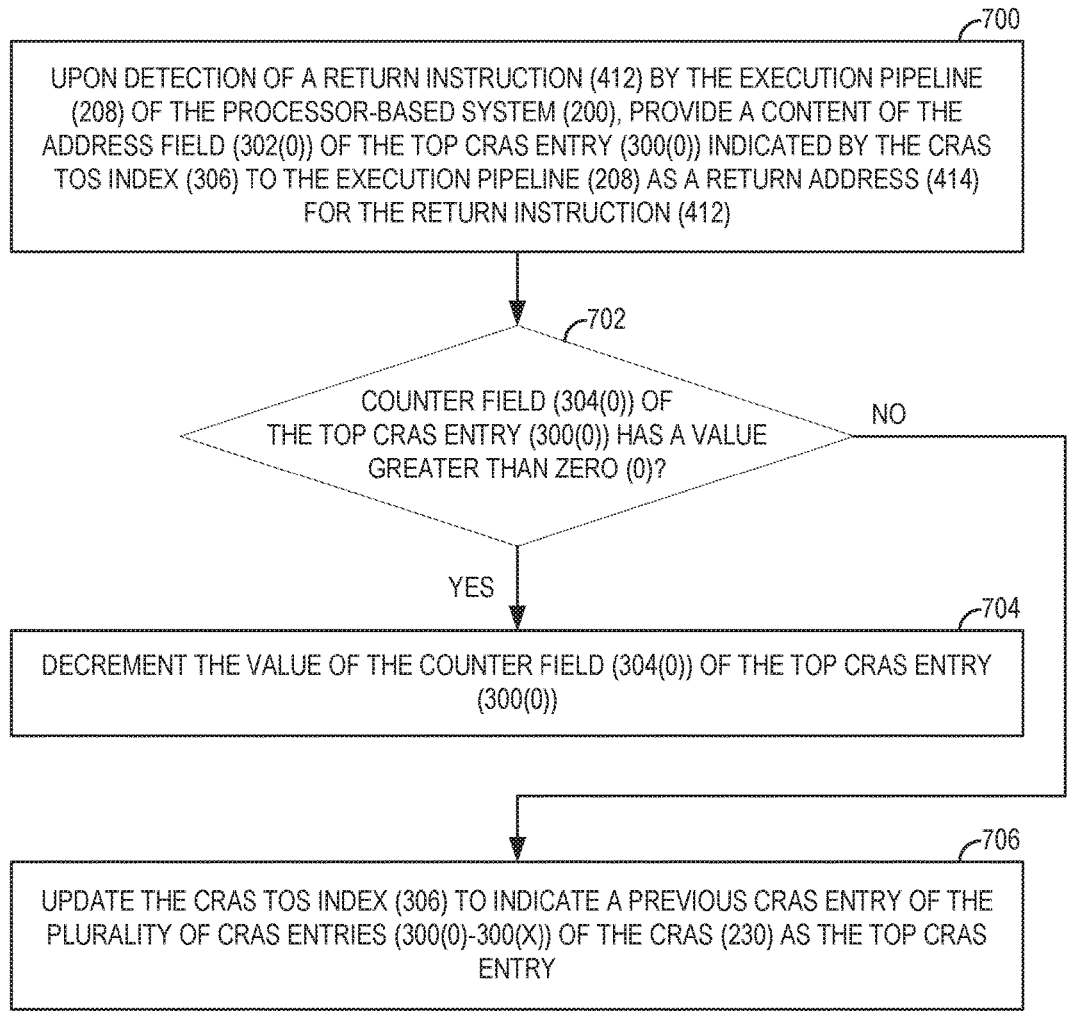
FIG. 7 is a flowchart illustrating further exemplary operations of the branch prediction circuit of FIG. 2 and the CRAS of FIGS. 2 and 3 for processing return instructions.

To illustrate further exemplary operations of the branch prediction circuit 228 of FIG. 2 and the CRAS 230 of FIGS. 2 and 3 for processing return instructions according to some aspects, FIG. 7 is provided. Elements of FIGS. 2, 3, and 4A-4C are referenced in describing FIG. 7 for the sake of clarity. In FIG. 7, the branch prediction circuit 228, upon detection of a return instruction 412 by the execution pipeline 208 of the processor-based system 200, provides a content of the address field 302(0) of the top CRAS entry 300(0) indicated by the CRAS TOS index 306 to the execution pipeline 208 as a return address 414 for the return instruction 412 (block 700). The branch prediction circuit 228 then determines whether the counter field 304(0) of the top CRAS entry 300(0) has a value greater than zero (0) (block 702). If so, the branch prediction circuit 228 decrements the value of the counter field 304(0) of the top CRAS entry 300(0) (block 704). However, if the branch prediction circuit 228 determines at decision block 702 that the counter field 304(0) of the top CRAS entry 300(0) does not have a value greater than zero (0), the branch prediction circuit 228 updates the CRAS TOS index 306 to indicate a previous CRAS entry of the plurality of CRAS entries 300(0)-300(X) of the CRAS 230 as the top CRAS entry 300(0).

Figure 8A:
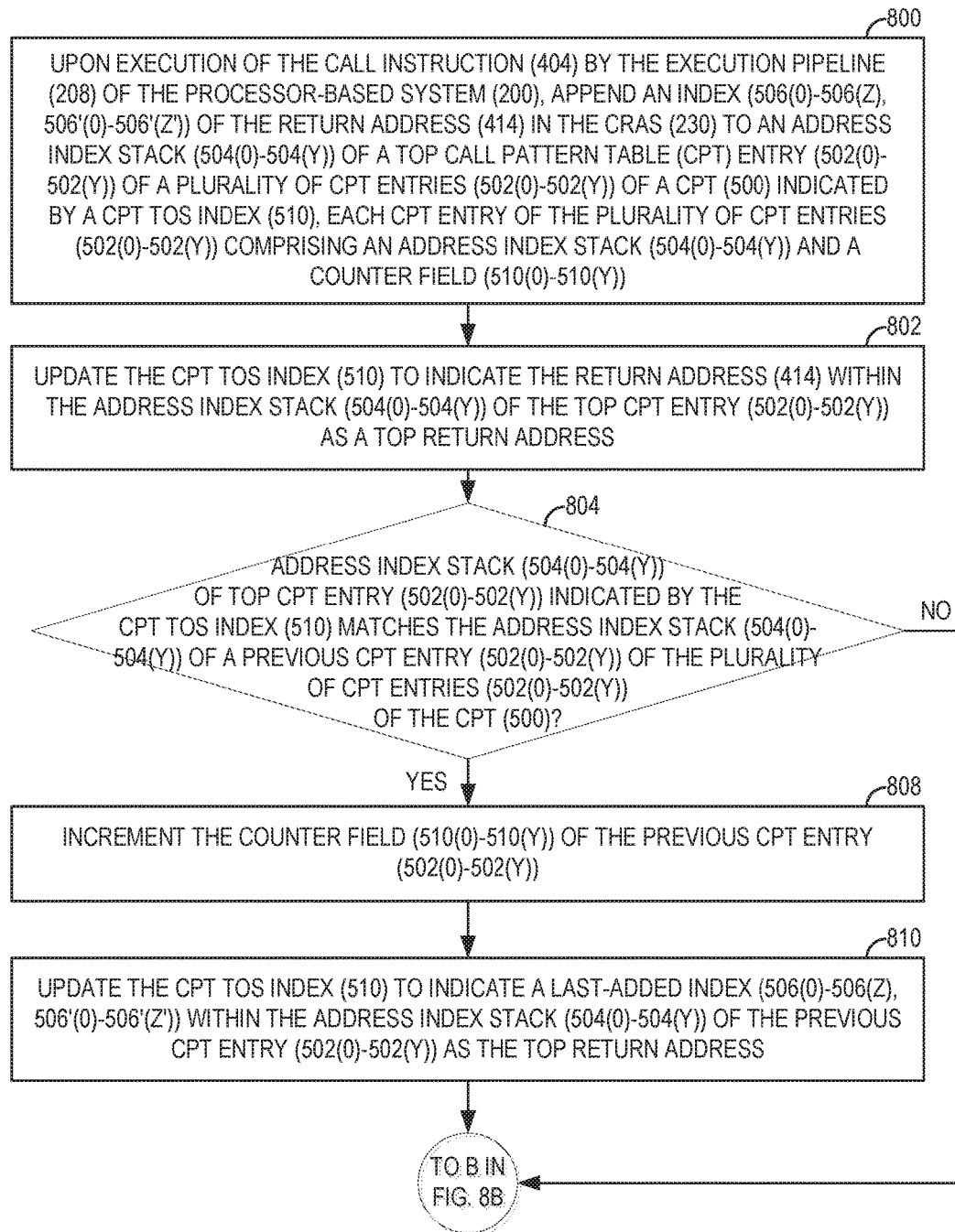
FIGS. 8A and 8B are flowcharts illustrating exemplary operations of the CPT of FIG. 5 for efficiently handling multi-level recursion by tracking sequences of calls.
Figure 8B:
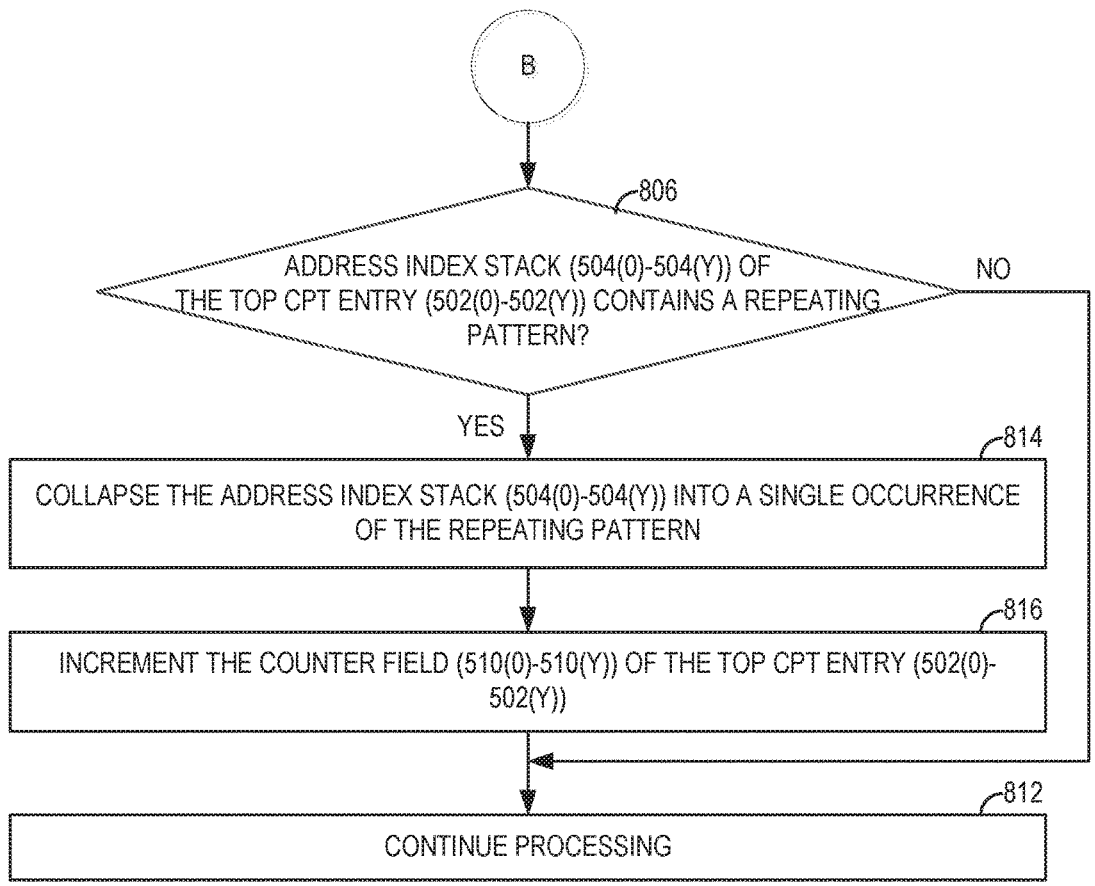

FIGS. 8A and 8B are flowcharts illustrating further exemplary operations of the branch prediction circuit 228 of FIG. 2 and the CPT 500 of FIG. 5 for efficiently handling multi-level recursion by tracking sequences of calls. For the sake of clarity, elements of FIGS. 2, 3, 4A-4C, and 5 are referenced in describing FIGS. 8A and 8B. Operations in FIG. 8A begins with the branch prediction circuit 228, upon execution of the call instruction 402 by the execution pipeline 208 of the processor-based system 200, appending an index 506(0)-506(Z), 506'(0)-506'(Z') of the return address 414 in the CRAS 230 to an address index stack 504(0)-504(Y) of a top CPT entry 502(0)-502(Y) of a plurality of CPT entries 502(0)-502(Y) of a CPT 500 indicated by a CPT TOS index 510, each CPT entry of the plurality of CPT entries 502(0)-502(Y) comprising an address index stack 504(0)-504(Y) and a counter field 508(0)-508(Y) (block 800). The branch prediction circuit 228 also updates the CPT TOS index 510 to indicate the return address 414 within the address index stack 504(0)-504(Y) of the top CPT entry 502(0)-502(Y) as a top return address (block 802).

The branch prediction circuit 228 then determines whether the address index stack 504(0)-504(Y) of the top CPT entry 502(0)-502(Y) indicated by the CPT TOS index 510 matches the address index stack 504(0)-504(Y) of a previous CPT entry 502(0)-502(Y) of the plurality of CPT entries 502(0)-502(Y) of the CPT 500 (block 804). If not, processing resumes at block 806 of FIG. 8B. However, if the address index stack 504(0)-504(Y) of the top CPT entry 502(0)-502(Y) indicated by the CPT TOS index 510 matches the address index stack 504(0)-504(Y) of a previous CPT entry 502(0)-502(Y), the branch prediction circuit 228 increments the counter field 508(0)-508(Y) of the previous CPT entry (502(0)-502(Y) (block 808). The branch prediction circuit 228 then updates the CPT TOS index 510 to indicate a last-added index 506(0)-506(Z), 506'(0)-506'(Z') within the address index stack 504(0)-504(Y) of the previous CPT entry 502(0)-502(Y) as the top return address (block 810). Processing then resumes at block 806 of FIG. 8B.

Referring now to FIG. 8B, the branch prediction circuit 228 next determines whether the address index stack 504 (0)-504(Y) of the top CPT entry 502(0)-502(Y) contains a repeating pattern (block 808). For instance, the branch prediction circuit 228 may determine that the address index stack 504(0)-504(Y) contains "A→B→A→B," which represents a repeating pattern of return addresses "A" followed by "B." If not, processing continues at block 812. However, if the address index stack 504(0)-504(Y) of the top CPT entry 502(0)-502(Y) does contains a repeating pattern, the branch prediction circuit 228 collapses the address index stack 504(0)-504(Y) into a single occurrence of the repeating pattern (e.g., by replacing the repeating pattern "A→B→A→B" with the single occurrence "A→B") (block 814). The branch prediction circuit 228 then increments the counter field 508(0)-508(Y) of the top CPT entry 502(0)-502(Y).

Figure 9:
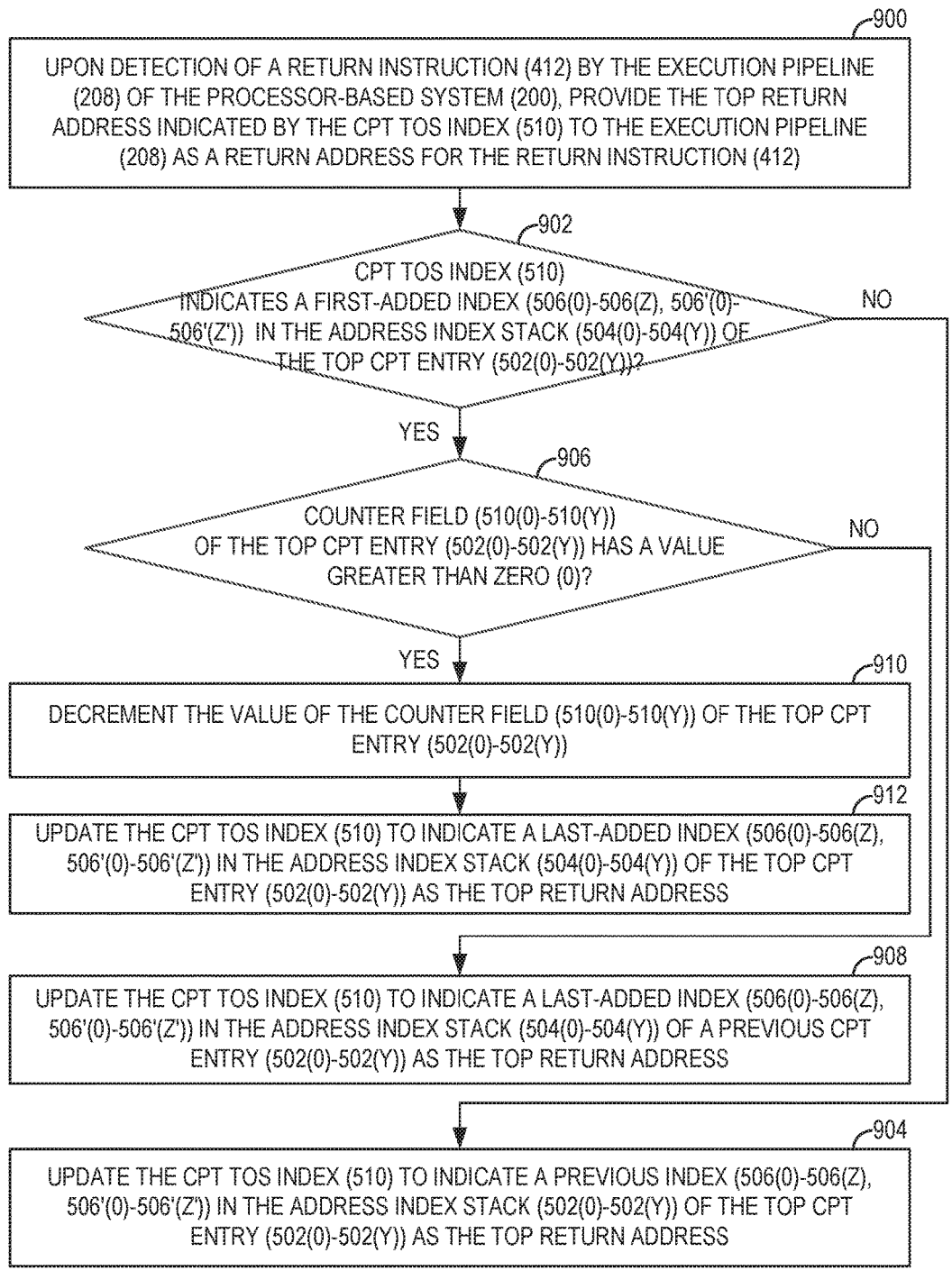
FIG. 9 is a flowchart illustrating further exemplary operations of the branch prediction circuit of FIG. 2 and the CPT of FIG. 5 for processing return instructions.

To illustrate further exemplary operations of the branch prediction circuit 228 of FIG. 2 and the CPT 500 of FIG. 5 for processing return instructions, FIG. 9 is provided. Elements of FIGS. 2, 3, 4A-4C, and 5 are referenced in describing FIG. 9 for the sake of clarity. In FIG. 9, operations begin with the branch prediction circuit 228, upon detection of a return instruction 412 by the execution pipeline 208 of the processor-based system 200, providing the top return address 414 indicated by the CPT TOS index 510 to the execution pipeline 208 as a return address for the return instruction 412 (block 900). The branch prediction circuit 228 then determines whether the CPT TOS index 510 indicates a first-added index 506(0)-506(Z), 506'(0)-506'(Z') (i.e., the oldest index 506(0)-506(Z), 506'(0)-506'(Z')) in the address index stack 504(0)-504(Y) of the top CPT entry 502(0)-502(Y) (block 902). If not, the branch prediction circuit 228 updates the CPT TOS index 510 to indicate a previous index 506(0)-506(Z), 506'(0)-506'(Z') within the address index stack 504(0)-504(Y) of the top CPT entry 502(0)-502(Y) as the top return address (block 904).

However, if the CPT TOS index 510 indicates a first-added index 506(0)-506(Z), 506'(0)-506'(Z') in the address index stack 504(0)-504(Y) of the top CPT entry 502(0)-502(Y), the branch prediction circuit 228 next determines whether the counter field 508(0)-508(Y) of the top CPT entry 502(0)-502(Y) has a value greater than zero (0) (block 906). If not, the branch prediction circuit 228 updates the CPT TOS index (510) to indicate a last-added index 506(0)-506(Z), 506'(0)-506'(Z') within the address index stack 504(0)-504(Y) of a previous CPT entry 502(0)-502(Y) as the top return address (block 908).

If the branch prediction circuit 228 determines at decision block 906 that the counter field 508(0)-508(Y) of the top CPT entry 502(0)-502(Y) has a value greater than zero (0), the branch prediction circuit 228 decrements the value of the counter field 508(0)-508(Y) of the top CPT entry 502(0)-502(Y) (block 910). The branch prediction circuit 228 then updates the CPT TOS index 510 to indicate a last-added index 506(0)-506(Z), 506'(0)-506'(Z') in the address index stack 504(0)-504(Y) of the top CPT entry 502(0)-502(Y) as the top return address (block 912).

Providing efficient recursion handling using CRASs in processor-based systems according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 10:
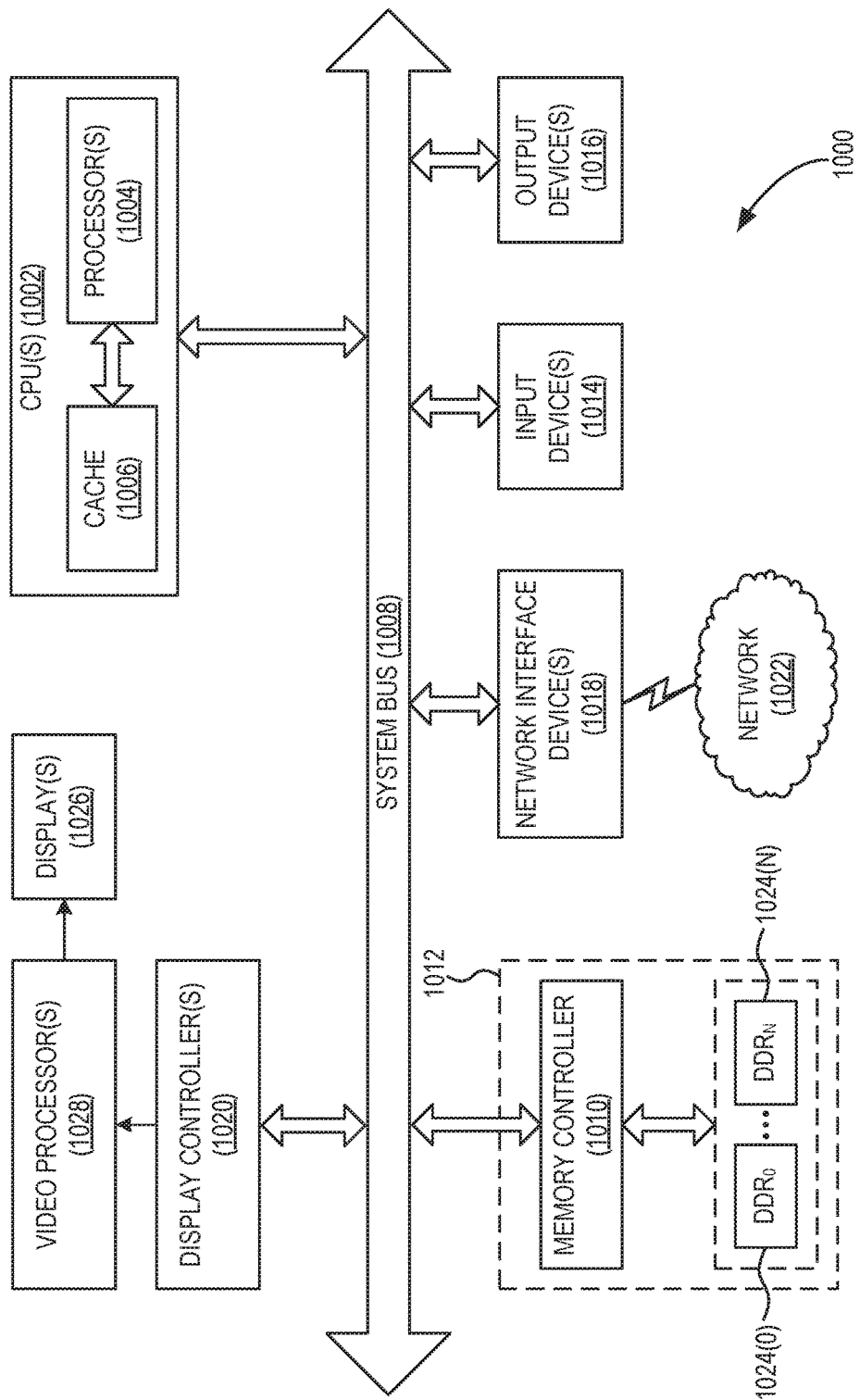
FIG. 10 is a block diagram of an exemplary processor-based system that can include of the branch prediction circuit of FIG. 2 and the CRAS of FIGS. 2 and 3.

In this regard, FIG. 10 illustrates an example of a processor-based system 1000 that corresponds to the processor-based system 200 of FIG. 2, and that can employ the branch prediction circuit 228 and the CRAS 230 of FIGS. 2 and 3. The processor-based system 1000 includes one or more CPUs 1002, each including one or more processors 1004. The CPU(s) 1002 may have cache memory 1006 that is coupled to the processor(s) 1004 for rapid access to temporarily stored data. The CPU(s) 1002 is coupled to a system bus 1008 and can intercouple master and slave devices included in the processor-based system 1000. As is well known, the CPU(s) 1002 communicates with these other devices by exchanging address, control, and data information over the system bus 1008. For example, the CPU(s) 1002 can communicate bus transaction requests to a memory controller 1010 as an example of a slave device.

Other master and slave devices can be connected to the system bus 1008. As illustrated in FIG. 10, these devices can include a memory system 1012, one or more input devices 1014, one or more output devices 1016, one or more network interface devices 1018, and one or more display controllers 1020, as examples. The input device(s) 1014 can include any type of input device, including, but not limited to, input keys, switches, voice processors, etc. The output device(s) 1016 can include any type of output device, including, but not limited to, audio, video, other visual indicators, etc. The network interface device(s) 1018 can be any devices configured to allow exchange of data to and from a network 1022. The network 1022 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 1018 can be configured to support any type of communications protocol desired. The memory system 1012 can include one or more memory units 1024(0)-1024(N).

The CPU(s) 1002 may also be configured to access the display controller(s) 1020 over the system bus 1008 to control information sent to one or more displays 1026. The display controller(s) 1020 sends information to the display(s) 1026 to be displayed via one or more video processors 1028, which process the information to be displayed into a format suitable for the display(s) 1026. The display(s) 1026 can include any type of display, including, but not limited to, a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A processor-based system for efficiently handling recursion, comprising:
    a branch prediction circuit comprising:
        a compressed return address stack (CRAS) comprising a plurality of CRAS entries, each CRAS entry of the plurality of CRAS entries comprising an address field and a counter field; and
        a CRAS top-of-stack (TOS) index to indicate a top CRAS entry of the plurality of CRAS entries of the CRAS;
    the branch prediction circuit configured to, upon execution of a call instruction by an execution pipeline of the processor-based system:
        determine a return address corresponding to the call instruction;
        determine whether the return address matches the address field of the top CRAS entry indicated by the CRAS TOS index;
        responsive to determining that the return address matches the address field of the top CRAS entry, increment the counter field of the top CRAS entry;
        responsive to determining that the return address does not match the address field of the top CRAS entry:
            update the CRAS TOS index to indicate a next CRAS entry of the plurality of CRAS entries of the CRAS as the top CRAS entry;
            store the return address in the address field of the top CRAS entry; and
                store a value of zero (0) in the counter field of the top CRAS entry; and
    the branch prediction circuit further configured to, upon detection of a return instruction by the execution pipeline of the processor-based system:
        provide a content of the address field of the top CRAS entry indicated by the CRAS TOS index to the execution pipeline as a return address for the return instruction;
        determine whether the counter field of the top CRAS entry has a value greater than zero (0);
        responsive to determining that the counter field of the top CRAS entry has a value greater than zero (0), decrement the value of the counter field of the top CRAS entry; and
        responsive to determining that the counter field of the top CRAS entry does not have a value greater than zero (0), update the CRAS TOS index to indicate a previous CRAS entry of the plurality of CRAS entries of the CRAS as the top CRAS entry.

2. The processor-based system of claim 1, wherein the branch prediction circuit further comprises:
    a call pattern table (CPT) comprising a plurality of CPT entries, each CPT entry of the plurality of CPT entries comprising an address index stack and a counter field;
    a CPT TOS index indicating a top return address within the address index stack of a top CPT entry of the plurality of CPT entries of the CPT;
    the branch prediction circuit further configured to, upon execution of the call instruction by the execution pipeline of the processor-based system:
        append an index of the return address in the CRAS to the address index stack of the top CPT entry of the plurality of CPT entries of the CPT indicated by the CPT TOS index; and
        update the CPT TOS index to indicate the index of the return address within the address index stack of the top CPT entry as the top return address.

3. The processor-based system of claim 2, wherein the branch prediction circuit is further configured to:
    determine whether the address index stack of the top CPT entry indicated by the CPT TOS index matches the address index stack of a previous CPT entry of the plurality of CPT entries of the CPT; and
    responsive to determining that the address index stack of the top CPT entry indicated by the CPT TOS index matches the address index stack of a previous CPT entry of the plurality of CPT entries of the CPT:
        increment the counter field of the previous CPT entry; and update the CPT TOS index to indicate the last index within the address index stack of the previous CPT entry as the top return address.

4. The processor-based system of claim 3, wherein the branch prediction circuit is further configured to:
   determine whether the address index stack of the top CPT entry contains a repeated pattern;
   responsive to determining that the address index stack of the top CPT entry contains a repeated pattern:
      collapse the address index stack into a single occurrence of the repeated pattern; and
      increment the counter field of the top CPT entry.

5. The processor-based system of claim 4, wherein the branch prediction circuit is further configured to, upon detection of the return instruction by the execution pipeline of the processor-based system:
   provide the top return address indicated by the CPT TOS index to the execution pipeline as the return address for the return instruction;
   determine whether the CPT TOS index indicates a first-added index in the address index stack of the top CPT entry;
   responsive to determining that the CPT TOS index indicates a first-added index in the address index stack of the top CPT entry:
      determine whether the counter field of the top CPT entry has a value greater than zero (0);
      responsive to determining that the counter field of the top CPT entry has a value greater than zero (0):
         decrement the value of the counter field of the top CPT entry; and
         update the CPT TOS index to indicate a last-added index in the address index stack of the top CPT entry as the top return address; and
      responsive to determining that the counter field of the top CPT entry does not have a value greater than zero (0), update the CPT TOS index to indicate a last-added index within the address index stack of a previous CPT entry as the top return address; and
   responsive to determining that the CPT TOS index does not indicate a first-added index in the address index stack of the top CPT entry, update the CPT TOS index to indicate a previous index within the address index stack of the top CPT entry as the top return address.

6. The processor-based system of claim 1 integrated into an integrated circuit (IC).

7. The processor-based system of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

8. A method for efficiently handling recursion, comprising:
   determining, by a branch prediction circuit of a processor-based system, a return address corresponding to a call instruction executed by an execution pipeline of the processor-based system;
   determining whether the return address matches an address field of a top compressed return address stack (CRAS) entry of a plurality of CRAS entries of a CRAS indicated by a CRAS top-of-stack (TOS) index, wherein each CRAS entry of the plurality of CRAS entries comprises an address field and a counter field;
   responsive to determining that the return address matches the address field of the top CRAS entry, incrementing the counter field of the top CRAS entry;
   responsive to determining that the return address does not match the address field of the top CRAS entry:
      updating the CRAS TOS index to indicate a next CRAS entry of the plurality of CRAS entries of the CRAS as the top CRAS entry;
      storing the return address in the address field of the top CRAS entry; and
      storing a value of zero (0) in the counter field of the top CRAS entry; and
   upon detection of a return instruction by the execution pipeline of the processor-based system;
      providing a content of the address field of the top CRAS entry indicated by the CRAS TOS index to the execution pipeline as a return address for the return instruction;
      determining whether the counter field of the top CRAS entry has a value greater than zero (0); and
      responsive to determining that the counter field of the top CRAS entry has a value greater than zero (0), decrementing the value of the counter field of the top CRAS entry.

9. The method of claim 8, further comprising, responsive to determining that the counter field of the top CRAS entry does not have a value greater than zero (0), updating the CRAS TOS index to indicate a previous CRAS entry of the plurality of CRAS entries of the CRAS as the top CRAS entry.

10. The method of claim 9, further comprising, upon execution of the call instruction by the execution pipeline of the processor-based system:
   appending an index of the return address in the CRAS to an address index stack of a top call pattern table (CPT) entry of a plurality of CPT entries of a CPT indicated by a CPT TOS index, each CPT entry of the plurality of CPT entries comprising an address index stack and a counter field; and
   updating the CPT TOS index to indicate the return address within the address index stack of the top CPT entry as a top return address.

11. The method of claim 10, further comprising:
   determining whether the address index stack of the top CPT entry indicated by the CPT TOS index matches the address index stack of a previous CPT entry of the plurality of CPT entries of the CPT; and
   responsive to determining that the address index stack of the top CPT entry indicated by the CPT TOS index matches the address index stack of a previous CPT entry of the plurality of CPT entries of the CPT:
      incrementing the counter field of the previous CPT entry; and updating the CPT TOS index to indicate a first-added index within the address index stack of the previous CPT entry as the top return address.

12. The method of claim 11, further comprising:
determining whether the address index stack of the top CPT entry contains a repeated pattern;
responsive to determining that the address index stack of the top CPT entry contains a repeated pattern:
collapsing the address index stack into a single occurrence of the repeated pattern; and
incrementing the counter field of the top CPT entry.

13. The method of claim 12, further comprising, upon detection of the return instruction by the execution pipeline of the processor-based system:
providing the top return address indicated by the CPT TOS index to the execution pipeline as the return address for the return instruction;
determining whether the CPT TOS index indicates a first-added index in the address index stack of the top CPT entry; and
responsive to determining that the CPT TOS index indicates a first-added index in the address index stack of the top CPT entry:
determining whether the counter field of the top CPT entry has a value greater than zero (0);
responsive to determining that the counter field of the top CPT entry has a value greater than zero (0):
decrementing the value of the counter field of the top CPT entry; and
updating the CPT TOS index to indicate a last-added index in the address index stack of the top CPT entry as the top return address.

14. The method of claim 13, further comprising, responsive to determining that the counter field of the top CPT entry does not have a value greater than zero (0), updating the CPT TOS index to indicate a last-added index within the address index stack of a previous CPT entry as the top return address.

15. The method of claim 14, further comprising, responsive to determining that the CPT TOS index does not indicate a first-added index in the address index stack of the top CPT entry, updating the CPT TOS index to indicate a previous index within the address index stack of the top CPT entry as the top return address.

16. A processor-based system for efficiently handling recursion, comprising:
a means for determining a return address corresponding to a call instruction executed by an execution pipeline of the processor-based system;
a means for determining whether the return address matches an address field of a top compressed return address stack (CRAS) entry of a plurality of CRAS entries of a CRAS indicated by a CRAS top-of-stack (TOS) index, wherein each CRAS entry of the plurality of CRAS entries comprises an address field and a counter field;
a means for incrementing the counter field of the top CRAS entry, responsive to determining that the return address matches the address field of the top CRAS entry;
a means for updating the CRAS TOS index to indicate a next CRAS entry of the plurality of CRAS entries of the CRAS as the top CRAS entry, responsive to determining that the return address does not match the address field of the top CRAS entry;
a means for storing the return address in the address field of the top CRAS entry, responsive to determining that the return address does not match the address field of the top CRAS entry;
a means for storing a value of zero (0) in the counter field of the top CRAS entry, responsive to determining that the return address does not match the address field of the top CRAS entry;
a means for providing a content of the address field of the top CRAS entry indicated by the CRAS TOS index to the execution pipeline as a return address for the return instruction upon detection of a return instruction by the execution pipeline of the processor-based system;
a means for determining whether the counter field of the top CRAS entry has a value greater than zero (0); and
a means for decrementing the value of the counter field of the top CRAS entry, responsive to determining that the counter field of the top CRAS entry has a value greater than zero (0).

17. A non-transitory computer-readable medium having stored thereon computer-executable instructions which, when executed by a processor, cause the processor to:
determine a return address corresponding to a call instruction executed by an execution pipeline of a processor-based system;
determine whether the return address matches an address field of a top compressed return address stack (CRAS) entry of a plurality of CRAS entries of a CRAS indicated by a CRAS top-of-stack (TOS) index, wherein each CRAS entry of the plurality of CRAS entries comprises an address field and a counter field;
responsive to determining that the return address matches the address field of the top CRAS entry, increment the counter field of the top CRAS entry;
responsive to determining that the return address does not match the address field of the top CRAS entry:
update the CRAS TOS index to indicate a next CRAS entry of the plurality of CRAS entries of the CRAS as the top CRAS entry;
store the return address in the address field of the top CRAS entry; and
store a value of zero (0) in the counter field of the top CRAS entry; and
upon detection of a return instruction by the execution pipeline of the processor-based system:
provide a content of the address field of the top CRAS entry indicated by the CRAS TOS index to the execution pipeline as a return address for the return instruction;
determine whether the counter field of the top CRAS entry has a value greater than zero (0); and
responsive to determining that the counter field of the top CRAS entry has a value greater than zero (0), decrement the value of the counter field of the top CRAS entry.

18. The non-transitory computer-readable medium of claim 17 having stored thereon computer-executable instructions which, when executed by a processor, further cause the processor to, responsive to determining that the counter field of the top CRAS entry does not have a value greater than zero (0), update the CRAS TOS index to indicate a previous CRAS entry of the plurality of CRAS entries of the CRAS as the top CRAS entry.

19. The non-transitory computer-readable medium of claim 18 having stored thereon computer-executable instructions which, when executed by a processor, further cause the processor to, upon execution of the call instruction by the execution pipeline of the processor-based system:
  append an index of the return address in the CRAS to an address index stack of a top call pattern table (CPT) entry of a plurality of CPT entries of a CPT indicated by a CPT TOS index, each CPT entry of the plurality of CPT entries comprising an address index stack and a counter field; and
  update the CPT TOS index to indicate the return address within the address index stack of the top CPT entry as a top return address.

20. The non-transitory computer-readable medium of claim 19 having stored thereon computer-executable instructions which, when executed by a processor, further cause the processor to:
  determine whether the address index stack of the top CPT entry indicated by the CPT TOS index matches the address index stack of a previous CPT entry of the plurality of CPT entries of the CPT; and
  responsive to determining that the address index stack of the top CPT entry indicated by the CPT TOS index matches the address index stack of a previous CPT entry of the plurality of CPT entries of the CPT:
    increment the counter field of the previous CPT entry; and
    update the CPT TOS index to indicate a first-added index within the address index stack of the previous CPT entry as the top return address.

21. The non-transitory computer-readable medium of claim 20 having stored thereon computer-executable instructions which, when executed by a processor, further cause the processor to:
  determine whether the address index stack of the top CPT entry contains a repeated pattern; and
  responsive to determining that the address index stack of the top CPT entry contains a repeated pattern:
    collapse the address index stack into a single occurrence of the repeated pattern; and
    increment the counter field of the top CPT entry.

22. The non-transitory computer-readable medium of claim 21 having stored thereon computer-executable instructions which, when executed by a processor, further cause the processor to, upon detection of the return instruction by the execution pipeline of the processor-based system:
  provide the top return address indicated by the CPT TOS index to the execution pipeline as the return address for the return instruction;
  determine whether the CPT TOS index indicates a first-added index in the address index stack of the top CPT entry; and
  responsive to determining that the CPT TOS index indicates a first-added index in the address index stack of the top CPT entry:
    determine whether the counter field of the top CPT entry has a value greater than zero (0); and
    responsive to determining that the counter field of the top CPT entry has a value greater than zero (0):
      decrement the value of the counter field of the top CPT entry; and
      update the CPT TOS index to indicate a last-added index in the address index stack of the top CPT entry as the top return address.

23. The non-transitory computer-readable medium of claim 22 having stored thereon computer-executable instructions which, when executed by a processor, further cause the processor to, responsive to determining that the counter field of the top CPT entry does not have a value greater than zero (0), update the CPT TOS index to indicate a last-added index within the address index stack of a previous CPT entry as the top return address.

24. The non-transitory computer-readable medium of claim 23 having stored thereon computer-executable instructions which, when executed by a processor, further cause the processor to, responsive to determining that the CPT TOS index does not indicate a first-added index in the address index stack of the top CPT entry, update the CPT TOS index to indicate a previous index within the address index stack of the top CPT entry as the top return address.

* * * * *